(12) United States Patent
Tanaka et al.

(10) Patent No.: US 7,143,753 B2
(45) Date of Patent: Dec. 5, 2006

(54) AIR AMOUNT CALCULATOR FOR INTERNAL COMBUSTION ENGINE

(75) Inventors: Makoto Tanaka, Susono (JP); Hideki Obayashi, Okazaki (JP)

(73) Assignee: Denso Corporation, Kariya (JP)

( * ) Notice: Subject to any disclaimer, the term of this patent is extended or adjusted under 35 U.S.C. 154(b) by 48 days.

(21) Appl. No.: 11/110,949

(22) Filed: Apr. 21, 2005

(65) Prior Publication Data

US 2005/0251317 A1   Nov. 10, 2005

(30) Foreign Application Priority Data

Apr. 21, 2004   (JP) .............................. 2004-125313

(51) Int. Cl.
*F02B 47/10* (2006.01)
*F02B 47/08* (2006.01)

(52) U.S. Cl. ................................ 123/568.14; 123/90.15

(58) Field of Classification Search ........... 123/568.14, 123/90.15, 90.1; 73/117.3, 118.2, 118.1; 701/101, 102, 105
See application file for complete search history.

(56) References Cited

U.S. PATENT DOCUMENTS

| | | | |
|---|---|---|---|
| 5,927,252 A | 7/1999 | Atsumi | ..................... 123/406.2 |
| 6,412,458 B1 * | 7/2002 | Kawasaki et al. | ........ 123/90.15 |
| 6,691,022 B1 * | 2/2004 | Takemura et al. | ........... 701/109 |
| 6,827,051 B1 * | 12/2004 | Kawasaki et al. | ........ 123/90.15 |
| 2001/0011541 A1 * | 8/2001 | Kawasaki et al. | ..... 123/568.14 |
| 2001/0042529 A1 * | 11/2001 | Kawasaki et al. | ........ 123/90.15 |
| 2006/0005821 A1 * | 1/2006 | Osumi et al. | ................ 123/674 |
| 2006/0075996 A1 * | 4/2006 | Yoshino et al. | ......... 123/568.14 |

FOREIGN PATENT DOCUMENTS

JP   59-206624   11/1984

* cited by examiner

*Primary Examiner*—Mahmoud Gimie
(74) *Attorney, Agent, or Firm*—Nixon & Vanderhye P.C.

(57) ABSTRACT

An intake air base amount calculation unit respectively calculates a base air amount Gbase, an intake air temperature correction coefficient Ka and a pulsation correction coefficient Kb, and calculates an intake air base amount Gnb based on these. An internal EGR amount calculation unit calculates an clearance volume EGR amount based on an exhaust valve closing timing EVC, and further calculates a backflow EGR amount based on a valve overlap amount OL, a rotation speed of engine Ne and an intake pipe pressure Pm, and still further calculates an internal EGR amount Gegr by adding the clearance volume EGR amount and the backflow EGR amount. Then, an intake air amount calculation unit calculates an intake air amount of cylinder Gn by subtracting the internal EGR amount Gegr from the intake air base amount Gnb.

14 Claims, 7 Drawing Sheets

AIR AMOUNT CALCULATOR FOR INTERNAL COMBUSTION ENGINE

CROSS REFERENCE TO RELATED APPLICATION

This application is based on Japanese Patent Application No. 2004-125313 filed on Apr. 21, 2004, the content of which is incorporated herein by reference.

FIELD OF THE INVENTION

The present invention relates to an air amount calculator for an internal combustion engine having variable valve trains which can calculate an intake air amount of a cylinder in the internal combustion engine with high accuracy.

BACKGROUND OF THE INVENTION

There are technologies to calculate an intake air amount of a cylinder in an internal combustion engine and control fuel injection amount and/or ignition timings based on the intake air amount of the cylinder. In these cases, the intake air amount of the cylinder is an air amount actually trapped in the cylinder and concerning combustion in the cylinder. Thus, accuracies in controlling the fuel injection amount and the ignition timings can be improved by employing the intake air amount of the cylinder as a parameter. A calculation method of the intake air amount of the cylinder is based on a rotation speed of engine and an intake pipe pressure.

Currently, many internal combustion engines provided with variable valve trains are put in practical uses. The variable valve trains adjust opening and closing timings of an intake valve and an exhaust valve to improve output power and fuel efficiency. In this case, internal EGR occurs by adjusting the opening and closing timings of the intake valve and the exhaust valve. Thus, the internal combustion engine provided with variable valve trains has an issue that the intake air amount of the cylinder cannot be calculated with accuracy, because unstable state of the internal EGR occurs by variations of the opening and closing timings of the valves, etc., even if the intake pipe pressure is constant. It can be considered to match every combination of parameters such as an operation range of engine, the opening and closing timings of the valves and so on to reflect the influence of the internal EGR. However, this causes another issue to increase matching processes and processing load.

As an air amount calculator for an internal combustion engine provided with variable valve trains, an art is known that is disclosed in U.S. Pat. No. 5,927,252 (JP-09-303242-A), for instance. In this art, an airflow meter detects the intake air amount in an ignition timing control, and the intake air amount of the cylinder is obtained as an average of the intake air amounts at opening and closing timings of the intake valve or as the intake air amount at a middle timing while the intake valve opens. Then, the ignition timings are calculated according to the intake air amount of the cylinder. However, the art is configured to derive the intake air amount of the cylinder basically from detection results of the airflow meter, and the ignition timing control is executed based on the intake air amount of the cylinder. Thus, this art has an issue that the intake air amount of cylinder cannot be calculated with accuracy because of detection lags of the airflow meter and the passage lags of the intake air through an intake pipe.

SUMMARY OF THE INVENTION

The present invention, in view of the above-described issues, has a principal object to provide an air amount calculator for an internal combustion engine which can calculate an intake air amount of a cylinder with high accuracy and with simplified calculation logics.

The air amount calculator for an internal combustion engine according to the present invention has a variable valve train, an intake air base amount calculator, an internal EGR amount calculator and an intake air amount calculator. The variable valve train varies an opening and closing timings or a lift height of at least one of an intake valve and an exhaust valve. The intake air base amount calculator calculates an intake air base amount based on an operation range of the internal combustion engine. The internal EGR amount calculator calculates an internal EGR amount generated by an opening and closing timings or a lift height of the intake valve or the exhaust valve. The intake air amount calculator calculates the intake air amount of cylinder according to the intake air base amount and the internal EGR amount.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

An air amount calculator for an internal combustion engine according to an embodiment of the present invention will be described in the following with reference to the drawings. The air amount calculator for an internal combustion engine according to the present embodiment constitutes an engine control system for a multi-cylinder four-stroke cycle engine for mounting on a vehicle. In the engine control system, an electronic control unit (hereinafter referred to as an ECU) forms a heart to execute a fuel injection amount control and an ignition timing control.

Figure 1:
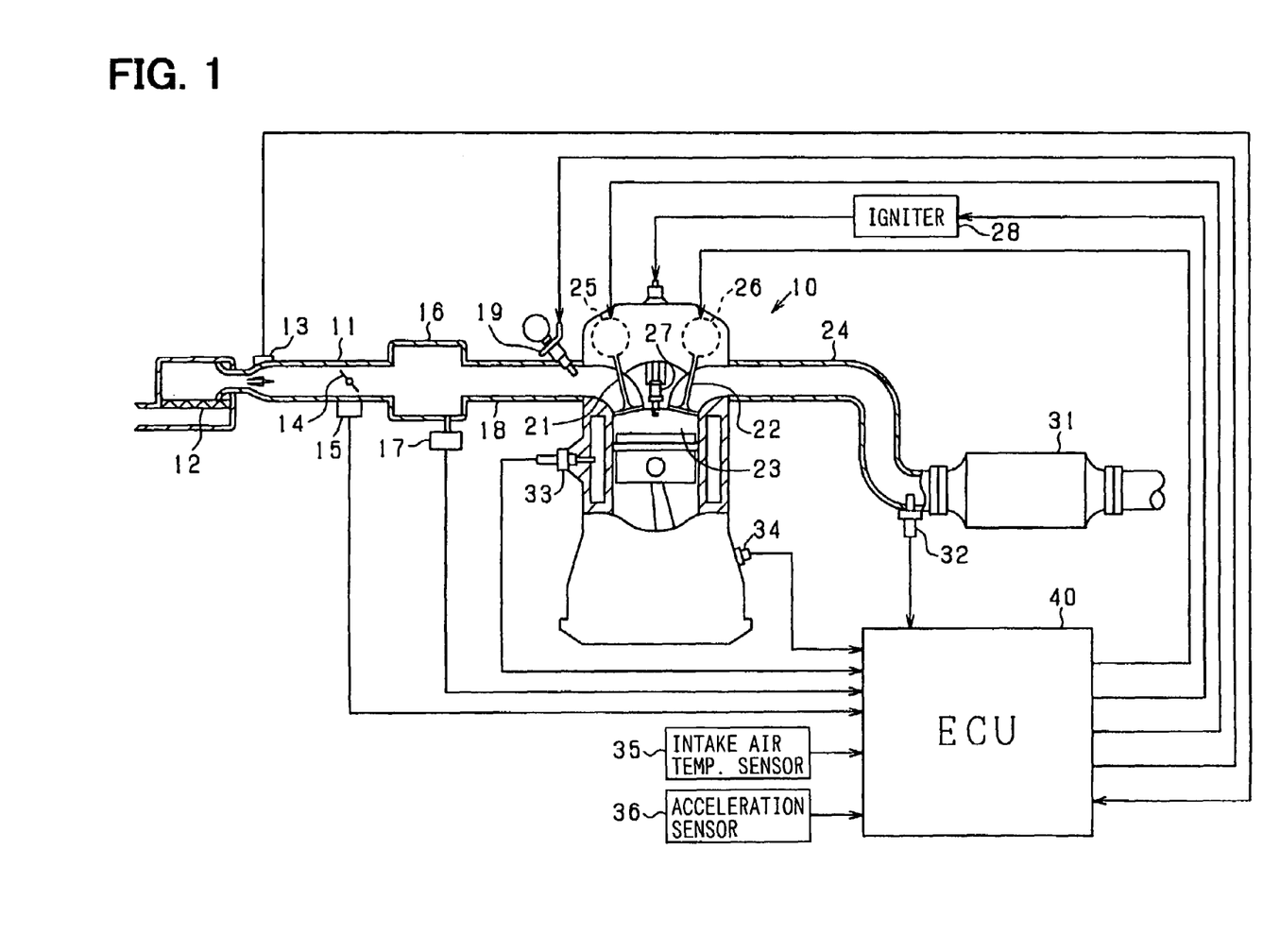
FIG. 1 is a schematic view of an engine control system according to an embodiment of the present invention.

First, an entire structure of the engine control system will be described with reference to FIG. 1. In an engine 10, an air cleaner 12 is provided at a most upstream portion of an intake pipe 11. An airflow meter 13 is provided downstream the air cleaner 12 to detect an intake air amount. A throttle valve 14, an opening degree of which is adjusted by an actuator such as a DC motor, and a throttle position sensor 15 to detect the opening degree of the throttle valve downstream the airflow meter 13. A surge tank 16 provided downstream the throttle valve 14, and an intake manifold air pressure sensor 17 is provided in the surge tank 16 to detect an intake manifold air pressure. An inlet manifold 18 is connected to the surge tank 10 to lead an air to each cylinder of the engine 10. In the inlet manifold 18, a fuel injection valve 19 is mounted in a proximity of the inlet port of each cylinder to supply and inject fuel.

An inlet port and an exhaust port of the engine 10 are respectively provided with an intake valve 21 and an exhaust valve 22. An opening action of the intake valve 21 induces an air-fuel mixture into a combustion chamber 23. An opening action of the exhaust valve 22 exhausts a burnt exhaust gas into an exhaust pipe 24. The intake valve 21 and the exhaust valve 22 are respectively provided with variable valve trains 25, 26. The variable valve trains 25, 26 have structures capable of changing an opening and closing timings of the valves 21, 22 in a continuous manner so as to adjust the opening and closing timings of the valves appropriately in accordance with an opening degree of a throttle and other operational conditions of the engine.

A cylinder head of every cylinder is provided with a spark plug 27. An igniter 28 applies a large voltage current to the spark plug 27 at appropriate ignition timings. This large voltage application generates a spark discharge between a pair of electrodes of each the spark plug 27 so as to ignite air-fuel mixture led in the combustion chamber 23 to be burnt.

The exhaust pipe 24 is provided with a catalyst 31 such as a three way to clean CO, HC, NOx and so on in exhaust gas. An air to fuel ratio sensor 32 (a linear air to fuel ratio sensor, oxygen sensor and so on) is provided upstream the catalyst 31 to detect an air-fuel ratio or rich/lean of the air-fuel mixture to set the exhaust gas as a detection target. Further, a cylinder block of the engine 10 is provided with a coolant temperature sensor 33 for detecting a temperature of coolant and a crank angle sensor 34 to output a pulse crank angle signals at every set angles of the engine 10 (for instance, at a period of 10° CA). Further, an intake air temperature sensor 35 for detecting a temperature of intake air and an accelerator sensor for detecting a stroke of accelerator pedal (the opening degree of the throttle valve) are provided.

Outputs of each of the above-described sensors are inputted into an ECU 40 for the engine control. The ECU 40 is structured mainly with a microcomputer composed of a CPU, a ROM, a RAM and so on. The ECU 40 executes respective control programs stored in the ROM so as to control fuel injections by the fuel injection valve 19 in accordance with operating conditions of the engine, ignition timings of the spark plug 27, open and closing timings of the intake valve 21 and the exhaust valve 22 by the variable valve trains 25, 26 and so on.

Figure 2:
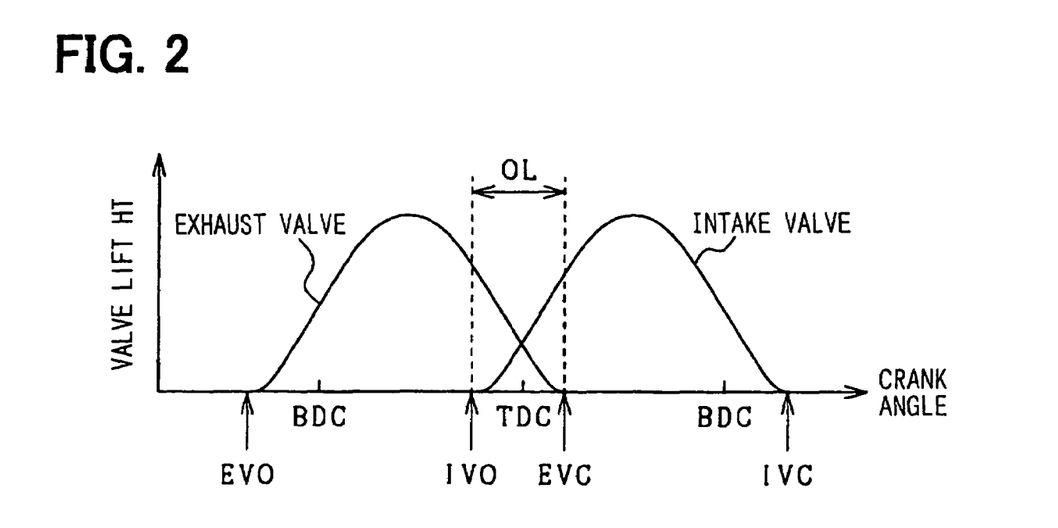
FIG. 2 is a graph showing lift motions of an intake valve and an exhaust valve.

FIG. 2 shows lift motions of the intake valve 21 and the exhaust valve 22. In FIG. 2, EVO is an exhaust valve opening timing, EVC is an exhaust valve closing timing, IVO is an intake valve opening timing, IVC is an intake valve closing timing and OL is a valve overlap amount. The open and closing timings of each of the valves 21, 22 are adjusted by the variable valve trains 25, 26. Then, the open and closing timings of the intake valve is controlled to a phase lead side with respect to a maximum phase lag, and the open and closing timings of the exhaust valve is controlled to a phase lag side with respect to a maximum phase lead respectively. Here, a phase leading control of the intake valve and a phase lagging control of the exhaust valve generates a valve overlap in which both valves are in opening states simultaneously. In the present embodiment, the intake valve 21 is configured so that IVO at a maximum phase lag is 40° after an intake TDC and can lead as 60° at maximum from the maximum phase lag. Further, the exhaust valve 22 is configured so that EVC at a maximum phase lead is 40° before the intake TDC and can lag as 60° at maximum from the maximum phase lead.

Here, when the exhaust valve 22 is controlled to the phase lag side and/or when the valve overlap amount is large, the internal EGR increases. In the present embodiment, the internal EGR is perceived separately into one EGR portion caused by the phase lag of the exhaust valve closing timing and another EGR portion caused by the valve overlap, a mechanism of which will be described with reference to FIG. 3.

Figure 3A:
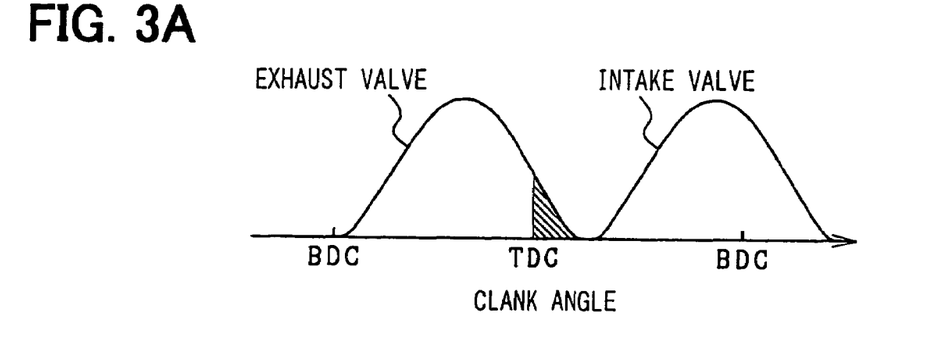
FIG. 3A is a graph explaining a clearance volume EGR and a backflow EGR.
Figure 3B:
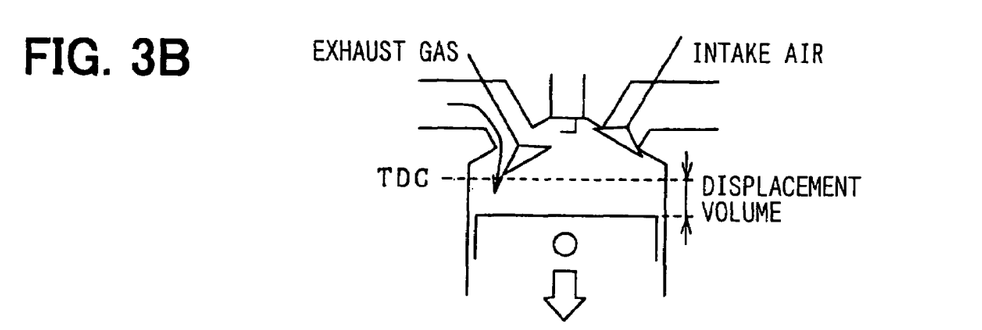
FIG. 3B is a schematic diagram explaining the clearance volume EGR and the backflow EGR.

FIGS. 3A, 3B shows a case when the exhaust valve closing timing EVC is after TDC (in which no valve overlap is assumed). In this case, the exhaust valve 22 is open even after TDC and a motion of the piston changes upward to downward, so that a burnt gas enters from the exhaust port into the cylinder (into the combustion chamber 23). Thus, the burnt gas remains in the cylinder after the closing timing of the exhaust valve 22 to generate the internal EGR. The inventors of the present application have confirmed that the internal EGR amount due to residual gas in the cylinder is determined on the cylinder volume extended by the cylinder's lift down by the closing timing of the exhaust valve 22. This internal EGR amount is hereinafter referred to as "clearance volume EGR amount". Here, the clearance volume is that a cylinder volume at the exhaust valve closing timing EVC, and the clearance volume EGR amount can be calculated in accordance with the exhaust valve closing timing EVC.

Figure 3C:
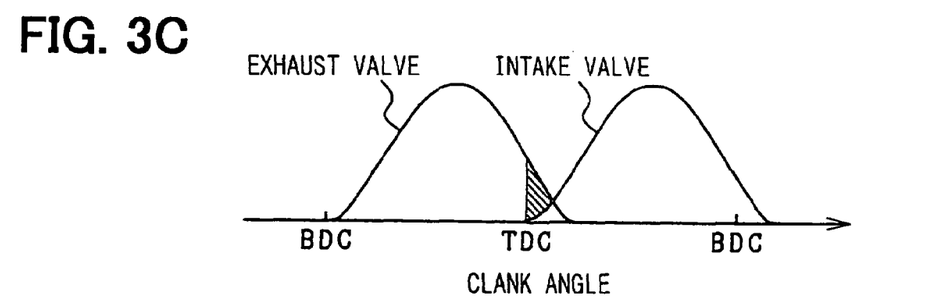
FIG. 3C is a graph explaining the clearance volume EGR and the backflow EGR.
Figure 3D:
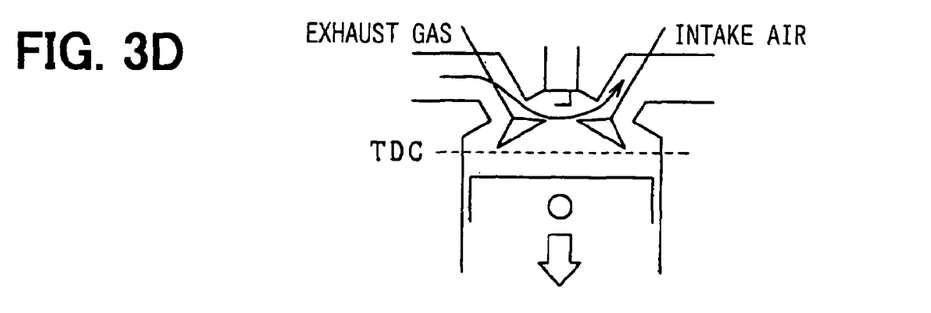
FIG. 3D is a schematic diagram explaining the clearance volume EGR and the backflow EGR.

FIGS. 3C, 3D shows a case when a valve overlap is generated. In this case, the intake valve 21 and the exhaust valve 22 opens simultaneously, so that a burnt gas is returned back to an inlet side. Thus, the burnt gas enters again into the cylinder in the proceeding intake process to generate internal EGR. The inventors of this application have confirmed that the internal EGR amount caused by backflow is determined to be dependent on the valve overlap amount. This internal EGR amount is hereinafter referred to as "backflow EGR amount". Here, the backflow EGR can be calculated in accordance with the valve overlap amount.

Figure 4A:
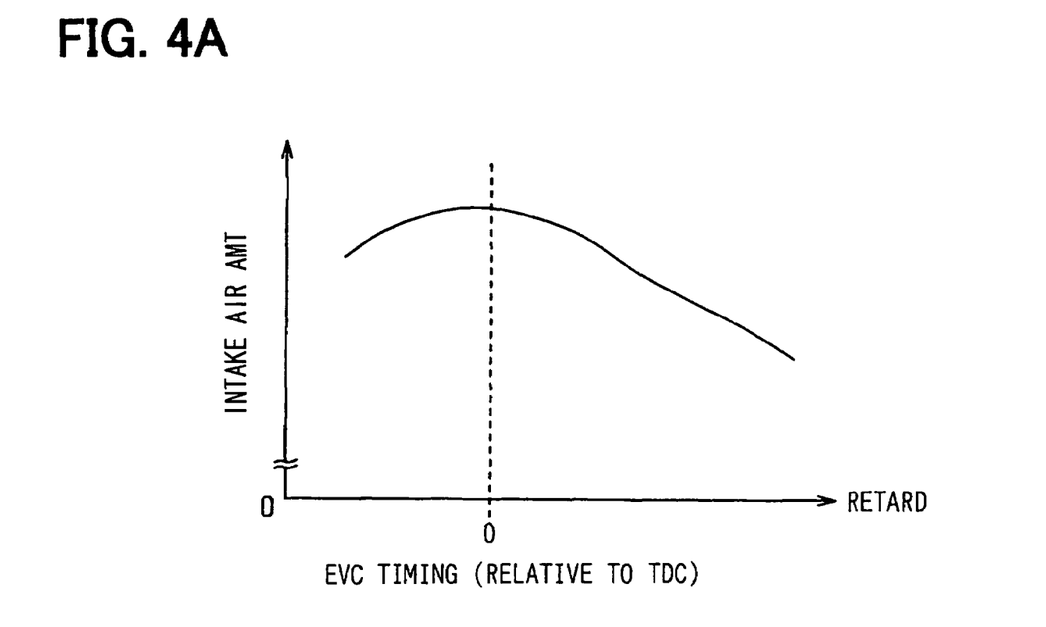
FIG. 4A is a graph showing a relation between the clearance volume EGR and an exhaust valve closing timing.
Figure 4B:
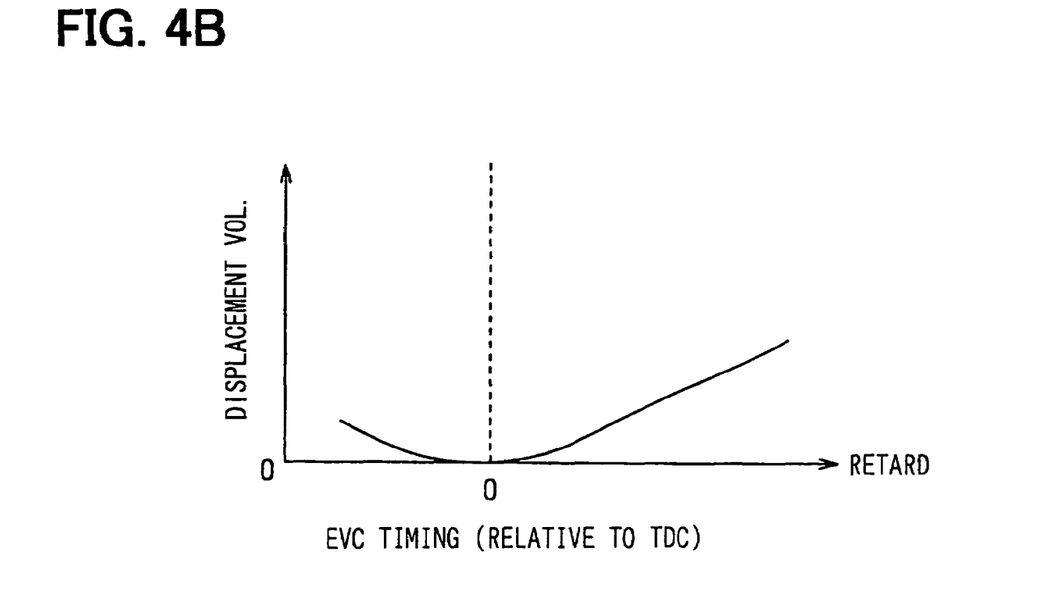
FIG. 4B is a graph showing a relation between the clearance volume EGR and the exhaust valve closing timing.
Figure 5A:
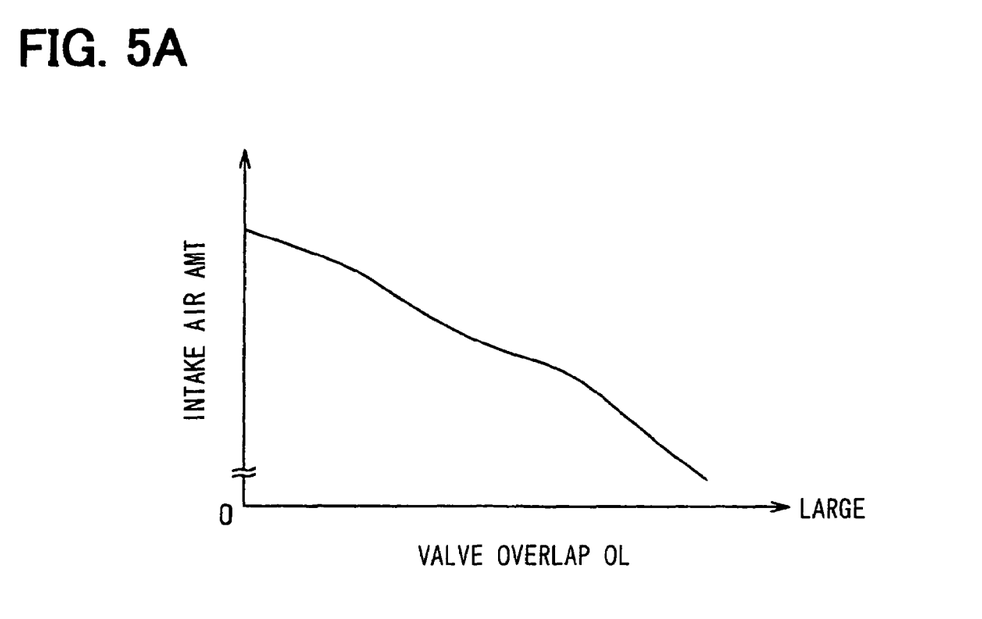
FIG. 5A is a graph showing a relation between the backflow EGR and a valve overlap amount.
Figure 5B:
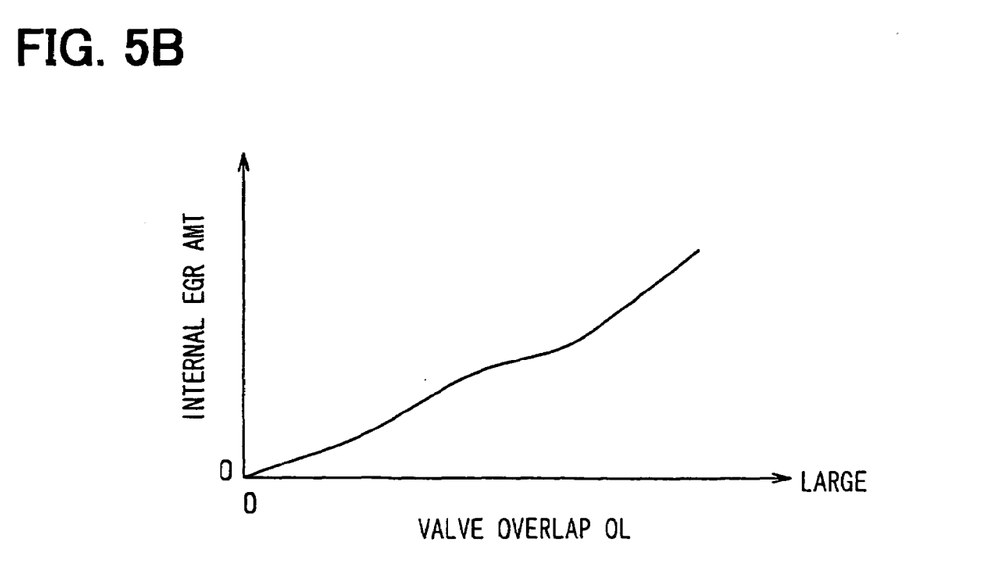
FIG. 5B is a graph showing a relation between the backflow EGR and the valve overlap amount.

When the internal EGR amount increases, an air amount induced into the cylinder (air inducing amount of the cylinder) decreases in accordance with the EGR amount. Here, the intake air amount of cylinder is decreased by the clearance volume EGR and the backflow EGR. As for the clearance volume EGR, as shown in FIGS. 4A, 4B, as the exhaust valve closing timing EVC shifts to a lag side with respect to the intake TDC, the clearance volume EGR amount increases, so that the air intake amount in the cylinder decreases accordingly. As for the backflow EGR, as shown in FIGS. 5A, 5B, as the valve overlap amount OL increases, the backflow EGR amount increases, so that the air intake amount in the cylinder decreases accordingly.

In order to improve accuracies in the fuel injection amount control and/or ignition timing control, it is necessary to detect a fresh gas amount actually induced in the cylinder (air intake amount of the cylinder Gn) at a closing timing of the intake valve 21 with high accuracy. Thus, in the present embodiment, a calculation accuracy of the intake air amount of cylinder by correcting for a decrease of the intake air amount of cylinder by the above-described internal EGR. In addition, the calculation accuracy of the intake air amount of cylinder is further improved by executing an intake air pulsation correction, an intake air temperature correction and so on.

The intake air amount of cylinder Gn is calculated, for instance, as a parameter in a calculation process of the fuel injection amount, practically in view of subsequent transitional fluctuations thereof. Specifically, it is configured to calculate the intake air amount of cylinder Gn based on the intake pipe pressure Pm, estimate subsequent intake pipe pressure Pm, and the intake air amount of cylinder Gn is calculated with the estimated Pm. As the estimation method of the intake pipe pressure Pm, a method using a throttle lag model can be adopted for example. The subsequent throttle opening degree is estimated with the stroke of the accelerator operated by a driver, and the subsequent intake pipe pressure Pm is estimated based on the estimated throttle opening degree.

Figure 6:
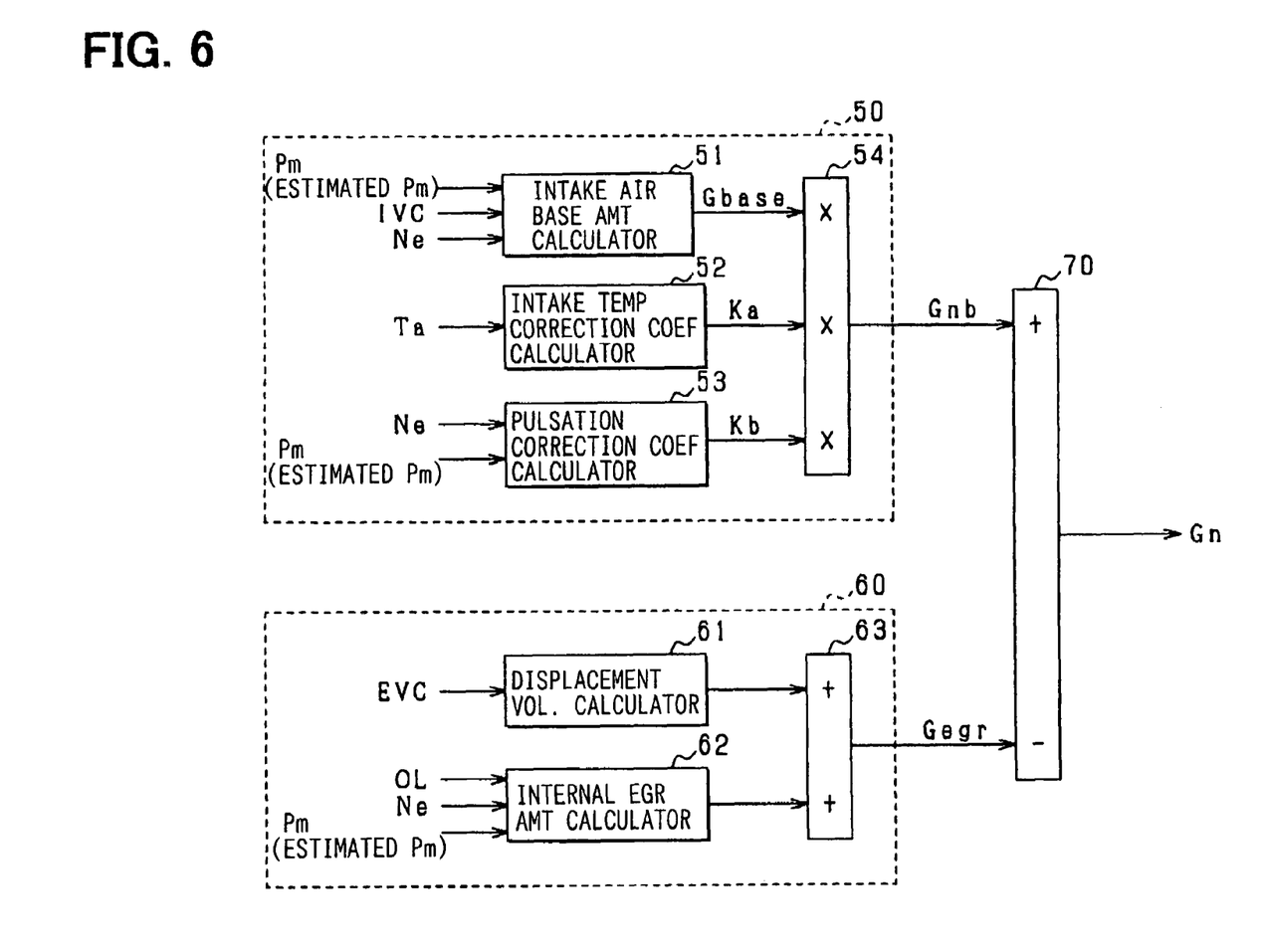
FIG. 6 is a functional block diagram of an ECU for calculating an intake air amount of a cylinder.

FIG. 6 is a functional block diagram of the ECU 40 concerning the calculation of the air amount in the cylinder. Here, every one of the intake pipe pressure Pm used in calculating the intake air amount of cylinder Gn is the above-described estimated Pm, and parameters such as an engine speed Ne, intake air temperature Ta are values based on detection results of the respective sensors.

The ECU 40 has an intake air base amount calculation unit 50 and an internal EGR amount calculation unit 60. The intake air base amount calculation unit 50 calculates an intake air base amount Gnb, and the internal EGR amount calculation unit 60 calculates the internal EGR amount Gegr.

Figure 7:
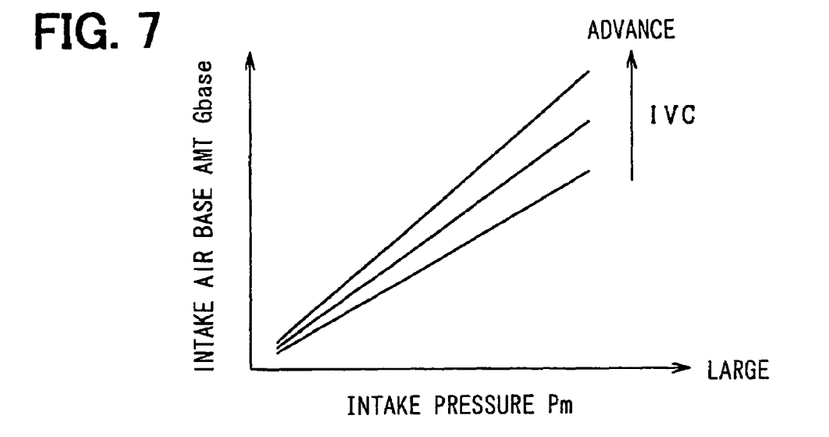
FIG. 7 is a graph showing a base air amount map.

The intake air base amount calculation unit 50 is now described in detail. In the intake air base amount calculation unit 50, an intake air base amount calculation segment 51 calculates a base air amount Gbase based on the intake pipe pressure Pm, the intake valve closing timing IVC and the rotation speed of engine Ne. Here, the base air amount Gbase is calculated with a base air amount map as shown in FIG. 7 making use of Pm, IVC and Ne at respective timings as parameters. In the base air amount map shown in FIG. 7, it is configured to calculate the base air amount Gbase in a condition that the internal EGR amount is at minimum. Further, a relation is defined that the base air amount Gbase generally increases as the intake pipe pressure Pm increases and/or the intake valve closing timing IVC leads at each rotation speed of engine Ne.

An intake air temperature correction coefficient calculation segment 52 calculates an intake air temperature correction coefficient Ka based on an intake air temperature Ta at respective times. Here, it is desirable to decrease the intake air temperature correction coefficient Ka as the intake air temperature Ta increases so as to correspond to an air density fluctuation due to the intake air temperature Ta.

Figure 8:
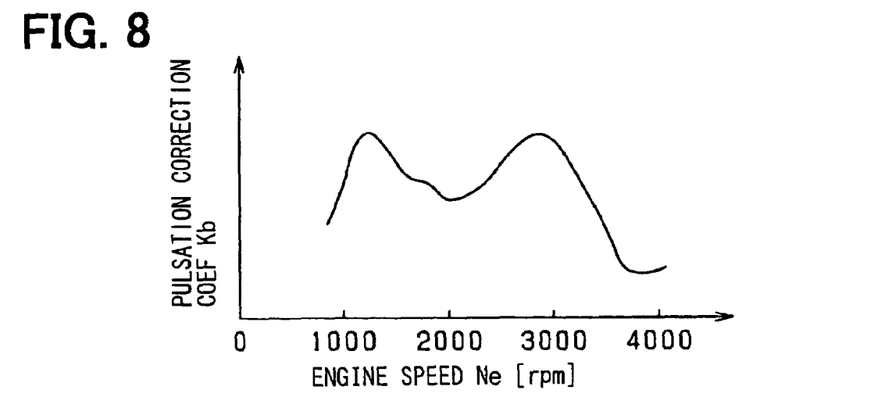
FIG. 8 is a graph showing a pulsation correction coefficient.

A pulsation correction coefficient calculation segment 53 calculates a pulsation correction coefficient Kb based on the rotation speed of engine Ne and the intake pipe pressure Pm. This is for restrict the variation of the intake air amount due to an intake air pulsation occurrence in the intake pipe. The pulsation correction coefficient Kb is calculated based on a relation shown in FIG. 8, for instance. However, the intake air pulsation occurs mainly at high load conditions (in WOT state, for example), so that it is desirable to calculate the pulsation correction coefficient Kb only at high load operation conditions.

An intake air base amount correction segment 54 calculates the intake air base amount Gnb by multiplying the base air amount Gbase by the intake air temperature coefficient Ka and the pulsation correction coefficient Kb (Gnb=Gbase×Ka×Kb).

Further, in an internal EGR amount calculation unit 60, a clearance volume EGR amount calculation segment 61 calculates the clearance volume EGR amount based on the exhaust valve closing timing EVC. Here, a relation between the exhaust valve closing timing EVC and the clearance volume EGR amount is shown in FIGS. 4A, 4B. The clearance volume EGR amount is calculated using a clearance volume EGR map produced based on relations shown in FIGS. 4A, 4B. Here, the exhaust valve closing timing EVC is a control prediction value of a subsequent control of the exhaust valve 22.

A backflow EGR amount calculation segment 62 calculates the backflow EGR amount based on the valve overlap amount OL, the rotation speed of engine Ne and the intake pipe pressure Pm. Here, a relation between the valve overlap amount and the backflow EGR amount is shown in FIGS. 5A, 5B. The backflow EGR amount is calculated using a backflow EGR map produced based on relations shown in FIGS. 5A, 5B. It is desirable to decrease the backflow EGR amount when the rotation speed of engine Ne is large to shorten a backflow time, and to increase the backflow EGR amount when the intake pipe pressure Pm is small (when a negative pressure is large) to increase a degree of backflow. Here, the valve overlap amount OL is a control prediction value of a subsequent control of the respective valves 21, 22. The differential pressure between the intake pipe pressure and the exhaust pressure may be used as a parameter instead of the intake pipe pressure Pm.

Then, an internal EGR amount calculation segment 63 calculates the internal EGR amount Gegr by adding the clearance volume EGR amount and the backflow EGR amount. Further, an intake air amount calculation unit 70 calculates the intake air amount of cylinder Gn by subtracting the internal EGR amount Gegr from the intake air base amount Gnb. Calculations of the fuel injection amount and the ignition timings are performed with the intake air amount of cylinder Gn, which is calculated as described above. In addition, the fuel injection controls and the ignition timing controls are performed based on these calculation results.

The following outstanding effects are derived from the air amount calculator for an internal combustion engine according to the present embodiment.

In calculating the intake air amount of cylinder Gn, the intake air base amount Gnb and the internal EGR amount Gegr are independently calculated from each other, and intake air amount of cylinder Gn is calculated with these Gnb and Gegr. Thus, the intake air amount of cylinder Gn is calculated with high accuracy to reflect the internal EGR amount therein. Here, it is configured to calculate the base air amount Gbase using the base air amount map as a base air amount mating data, and to calculate the internal EGR amount using the clearance volume EGR map and the backflow EGR map as an internal EGR amount matching data. Thus, the number of matching combinations is decreased to negate for the need for complicated matching processes. Further, it is possible to decrease the data of the respective map data (it is possible to restrict the map data from bulging). According to the above-described method, it becomes possible to calculate the intake air amount of cylinder Gn with high accuracy and with simplified calculation logics. By a calculation accuracy increase of the intake air amount of cylinder Gn, it becomes possible also to improve the control accuracy of the fuel injection amount and the ignition timings.

Further, by configuring to calculate the internal EGR amount by adding the clearance volume EGR amount (a first gas amount) and the backflow EGR amount (a second gas amount), it is possible to calculate the internal EGR amount accurately in accordance with the generation determinants of the internal EGR, so as to improve an calculation accuracy of the intake air amount of cylinder Gn.

In calculating the clearance volume EGR amount and the backflow EGR amount, it is configured to use the subsequent control prediction values (the exhaust valve closing timing EVC and the valve overlap amount OL) as parameters, so that it becomes possible to calculate the internal EGR amount with high accuracy even during a transient time and the like when operating conditions suddenly changes.

Furthermore, in calculating the intake air base amount Gnb, it is configured to use the prediction values of the intake pipe pressure Pm allowing subsequent variations thereof (the prediction Pm) as a parameter, so that it becomes possible to calculate the intake air base amount Gnb with high accuracy even during a transient time and the like when operating conditions suddenly changes.

The intake air base amount Gnb is an entire gas amount (fresh gas+burnt gas) trapped in the cylinder at the intake valve closing timing, which can be obtained accurately by adopting the rotation speed of engine Ne, the intake pipe pressure Pm and the intake valve closing timing as parameters. In addition, by applying an intake air pulsation correction and intake air temperature correction in calculating the intake air base amount Gnb, the calculation accuracy of the intake air amount of cylinder Gn is greatly improved.

The present invention is not limited to the above-described embodiment and may be carried out as follows, for instance.

It may be configured to calculate the internal EGR amount to employ the exhaust pressure in the exhaust pipe 24 of the engine as another parameter. In this case, the clearance volume EGR amount or the backflow EGR amount changes in accordance with the exhaust pressure. Specifically, as the exhaust pressure increases, it is considered that the clearance volume EGR amount of the backflow EGR amount increases. By adding the exhaust pressure as another parameter, the clearance volume EGR amount and the backflow EGR amount can be calculated with higher accuracy, so that the calculation accuracy of the internal EGR amount is improved. Accordingly, it is possible to calculate the intake air amount of cylinder Gn with high accuracy even during an exhaust pressure fluctuation time.

Figure 9:
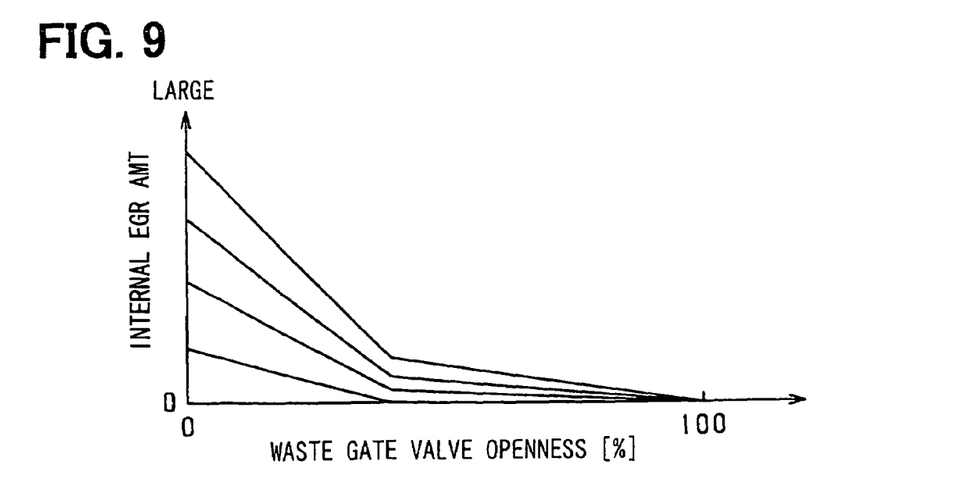
FIG. 9 is a graph showing a relation between an opening degree of a waste gate valve and the backflow EGR amount.

In an engine provided with a turbo compressor (a supercharger), it may be configured to calculate the internal EGR amount by employing the opening degree of a waste gate valve provided to detour the exhaust supercharger. In this case, when the opening degree of the waste gate valve changes, the exhaust pressure changes, and the clearance volume EGR amount or the backflow EGR amount changes. Specifically, as the opening degree of the waste gate valve is smaller, the exhaust pressure increases, so as to increase the clearance volume EGR amount or the backflow EGR amount. FIG. 9 shows a relation between an opening degree of a waste gate valve and the backflow EGR amount. By adding the opening degree of the waste gate valve, the clearance volume EGR amount and the backflow EGR amount can be calculated with higher accuracy, so as to improve the calculation accuracy of the internal EGR amount. Accordingly, it is possible to calculate the intake air amount of cylinder Gn with high accuracy even when the opening degree of the waste gate valve changes.

In the above-described embodiment, it is configured to calculate the internal EGR amount by calculating the clearance volume EGR amount and the backflow EGR amount independently from each other and adding them. It is possible to modify this configuration to calculate internal EGR amount directly from a map and the like without separating the clearance volume EGR and the backflow EGR. Even in this case, by calculating the intake air base amount Gnb and the internal EGR amount Gegr independently from each other, it is possible to simplify the calculation logics and to improve the calculation accuracy of the intake air amount of cylinder Gn as described above. It is desirable to calculate the intake air base amount Gnb and the internal EGR amount Gegr using map data prepared for each of them.

In the above-described embodiment, it is configured to calculate the internal EGR amount generally in accordance with opening and closing timings of the intake valve and the exhaust valve. This configuration may be modified. For instance, in an engine having a variable valve trains capable of variable valve lift height, the internal EGR amount may be calculated by adopting a valve lift height as a parameter.

In the above-described embodiment, the intake air amount of cylinder Gn is calculated by subtracting the internal EGR amount Gegr from the intake air base amount Gnb. This procedure may be modified. For instance, the intake air amount of cylinder Gn may be calculated by determining a correction coefficient by the internal EGR amount Gegr (here, the correction coefficient<1) and correcting the intake air base amount Gnb by the correction coefficient.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air amount calculator for an internal combustion engine comprising:
    a variable valve train for varying an opening and closing timings or a lift height of at least one of an intake valve and an exhaust valve;
    a base air amount calculator for calculating a base air amount based on an operating range of the internal combustion engine;
    an internal EGR amount calculator for calculating an internal EGR amount generated by the open and closing timings or the lift height of the intake valve or the exhaust valve; and
    an intake air amount calculator for calculating the intake air amount of cylinder with the base air amount and the internal EGR amount.

2. The air amount calculator for an internal combustion engine according to claim 1, wherein the internal EGR amount calculator calculates the internal EGR amount based on:
    an intake pipe pressure;
    a rotation speed of the internal combustion engine;
    the closing timing of the exhaust valve; and
    a valve opening overlap amount of the intake valve and the exhaust valve.

3. The air amount calculator for an internal combustion engine according to claim 2, wherein the internal EGR amount calculator calculates the internal EGR amount further based on an exhaust pressure in an exhaust passage of the internal combustion engine.

4. The air amount calculator for an internal combustion engine according to claim 2, the air amount calculator being adopted in the internal combustion engine having:
   a supercharger for supercharging an intake air supplied to the internal combustion engine by operating a turbine disposed in an exhaust passage and connected to a compressor provided in an inlet passage; and
   a waste gate valve for adjusting the supercharging pressure by detouring the discharge passage, and wherein the internal EGR amount calculator calculates the internal EGR amount further based on the opening degree of the waste gate valve.

5. The air amount calculator for an internal combustion engine according to claim 1, wherein the internal EGR amount calculator has:
   a means for calculating a first gas amount which is a burnt gas amount left in the cylinder after a combustion; and
   a means for calculating a second gas amount which is a burnt gas amount flowing back to a side of the intake passage, and wherein the internal EGR calculator calculates the internal EGR amount by adding the first gas amount and the second gas amount.

6. The air amount calculator for an internal combustion engine according to claim 5, wherein the internal EGR amount calculator calculates the first gas amount based on at least a closing timing of the exhaust valve.

7. The air amount calculator for an internal combustion engine according to claim 5, wherein the internal EGR amount calculator calculates the second gas amount based on at least an overlap amount of the opening timings of the intake valve and the exhaust valve.

8. The air amount calculator for an internal combustion engine according to claim 5, wherein the internal EGR amount calculator calculates at least one of the first gas amount and the second gas amount further based on an exhaust pressure in an exhaust passage of the internal combustion engine.

9. The air amount calculator for an internal combustion engine according to claim 5, the air amount calculator being adopted in the internal combustion engine having:
   a supercharger for supercharging an intake air supplied to the internal combustion engine by operating a turbine disposed in an exhaust passage and connected to a compressor provided in an inlet passage; and
   a waste gate valve for adjusting the supercharging pressure by detouring the discharge passage, and wherein the internal EGR amount calculator calculates at least one of the first gas amount or the second gas amount further based on an opening degree of the waste gate valve.

10. The air amount calculator for an internal combustion engine according to claim 1, further comprising a predictor for predicting a variations of the opening and closing timings of the valves, and wherein the internal EGR amount calculator calculates the internal EGR amount based on the subsequent variations of the opening and closing timings of the valves.

11. The air amount calculator for an internal combustion engine according to claim 1, further comprising a predictor for predicting a subsequent load of the internal combustion engine, and wherein the base air amount calculator calculates the base air amount using the subsequent load as a parameter.

12. The air amount calculator for an internal combustion engine according to claim 1, wherein the base air amount calculator calculates the base air amount based on:
   a rotational speed and load of the internal combustion engine; and
   a closing timing of the intake valve.

13. The air amount calculator for an internal combustion engine according to claim 1, further comprising a correction means for correcting the base air amount to cancel an effect of an intake air pulsation occurring in accordance with a rotation speed of the internal combustion engine in an operation condition over a predetermined load.

14. The air amount calculator for an internal combustion engine according to claim 1, further comprising a correction means for correcting the base air amount in accordance with an air temperature induced from the intake passage.

* * * * *